United States Patent [19]
Van Selous

[11] Patent Number: 5,544,565
[45] Date of Patent: Aug. 13, 1996

[54] BRAKE BAND SERVO FOR AUTOMATIC TRANSMISSION

[75] Inventor: Joseph S. Van Selous, Highland, Mich.

[73] Assignee: Ford Motor Company, Dearborn, Mich.

[21] Appl. No.: 399,259

[22] Filed: Mar. 6, 1995

[51] Int. Cl.⁶ .................................................. F01B 31/00
[52] U.S. Cl. .................... 92/130 R; 188/77 R; 92/165 R
[58] Field of Search .............................. 92/13.7, 14, 29, 92/30, 84, 130 R, 165; 188/77 R

[56] References Cited

U.S. PATENT DOCUMENTS

| | | | |
|---|---|---|---|
| 3,353,637 | 11/1967 | Chana | 92/52 |
| 4,388,986 | 6/1983 | Umezawa | 188/77 R |
| 4,881,453 | 11/1989 | Armstrong | |
| 5,014,599 | 5/1991 | Kocsis et al. | 92/84 |
| 5,018,434 | 5/1991 | Haka | 92/29 |

FOREIGN PATENT DOCUMENTS

| | | | |
|---|---|---|---|
| 0698844 | 12/1964 | Canada | 92/84 |
| 0076243 | 6/1980 | Japan | 92/130 R |

*Primary Examiner*—Thomas E. Denion
*Attorney, Agent, or Firm*—Frank G. McKenzie; Roger L. May

[57] ABSTRACT

A servo for operating a brake band in an automatic transmission includes a transmission casing defining a cylinder, a servo piston supported for displacement within the cylinder, a piston stem defining a locking shoulder, a compression spring fitted over the piston stem, and a spring retainer fitted over the piston stem of the spring defining a shoulder resiliently engaging the shoulder formed on the piston stem.

10 Claims, 2 Drawing Sheets

5,544,565

BRAKE BAND SERVO FOR AUTOMATIC TRANSMISSION

BACKGROUND OF THE INVENTION

1. Field of the Invention

This invention pertains to the field of automatic transmission control and to hydraulic actuation of a brake that holds a component of a gearset against rotation.

2. Description of the Prior Art

A servo mechanism used to operate a brake band in an automatic transmission conventionally includes a hydraulically actuated piston, a piston chamber, within which a piston moves in response to the presence and absence of hydraulic pressure in the chamber.

U.S. Pat. No. 4,881,453 describes a servo mechanism in a housing, whose interior contains circumferentially spaced locating pilot means that cooperate with a socket cavity to orient the housing. The interior of the housing contains a piston chamber within which a piston is slidably received. An actuating pin is secured to the piston, and the actuating pin is slidably received within a pilot bore that extends longitudinally outward from the piston chamber inward of a pin pilot presented from the housing of the servo mechanism to guide the actuating pin as it operates within the interior cavity of the transmission casing. The actuating pin is also secured to a friction band assembly associated with the planetary gearset.

A cover is secured to the transmission casing to act with the closure face, thereby sealing the socket cavity and interior of the case from atmosphere. The cover also acts with the housing to close one end of the piston chamber, thereby defining a pressure chamber to which the head of the piston is exposed.

SUMMARY OF THE INVENTION

It is an object of the present invention to provide an improved servo mechanism that substantially reduces the complexity of assembly. The servo includes a spring retainer that holds a servo return spring compressed near its installed height.

An advantage of the servo mechanism of this invention is to allow the transmission control gaskets, plate, and control bodies to be installed over the servo to complete the servo installation without a special servo cover or retainer.

It is another object of the present invention to provide a servo mechanism that can be installed by hand without tools.

It is yet another object of the present invention to provide a self-locking retainer in a servo mechanism that temporarily stores the potential energy of the servo return spring during assembly of the servo mechanism in the transmission case.

A servo for actuating a brake according to this invention includes a piston sealed for movement along a cylinder, supporting a stem fixed to the piston and directed axially from the piston, the stem having a first cylindrical surface, a second cylindrical surface adjacent and slightly smaller than the first cylindrical surface, said first and second surfaces defining a shoulder. A retainer has an opening through which the stem piston extends, a shoulder extending into the opening and sized smaller than the stem to produce an interference fit therebetween. A spring carried on the stem, has a first end adjacent the retainer and a second end adjacent the piston. The retainer shoulder is urged into engagement with the shoulder of the stem due to the said interference fit, said engagement holding the piston against movement relative to the retainer in one axial direction and permitting movement of the piston relative to the retainer in a direction opposite the first direction.

DESCRIPTION OF THE PREFERRED EMBODIMENT

Figure 1:
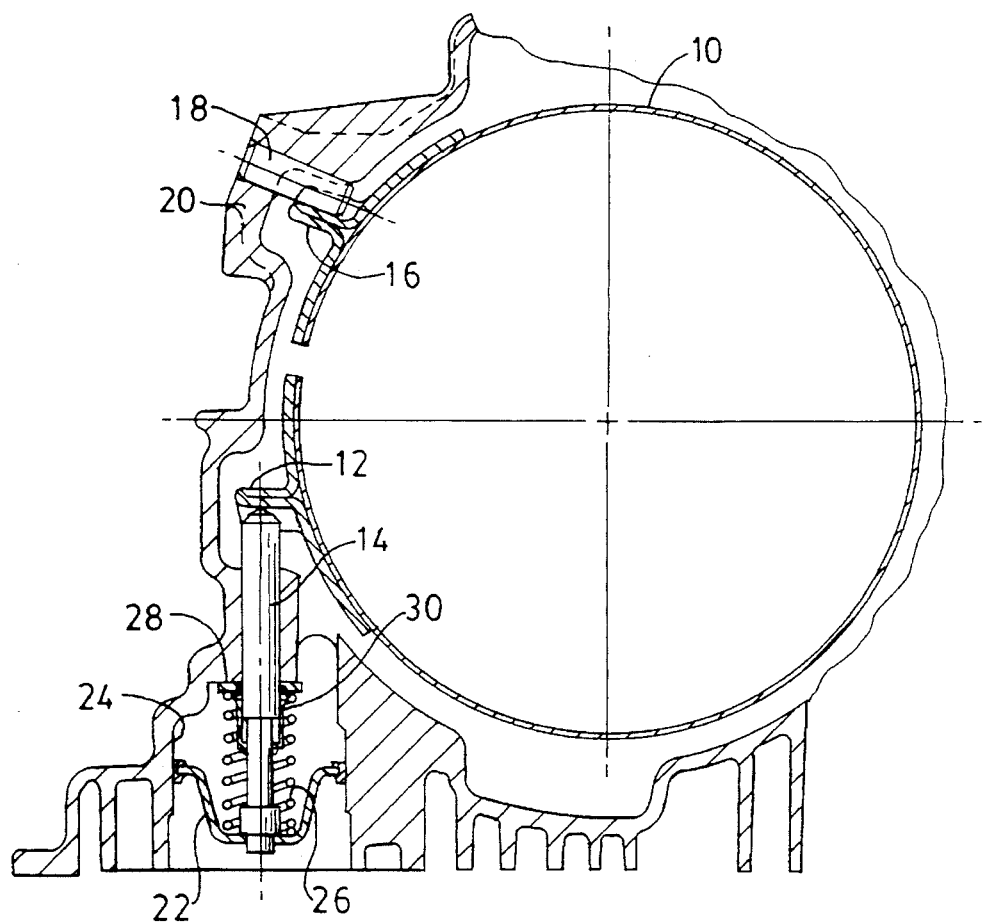
FIG. 1 is a cross section through a brake servo according to the present invention.

Referring first to FIG. 1, in which a brake band servo is illustrated in a stroked position to take up clearance, a brake band 10 encircling a brake drum (not shown) has one end 12 contacting a servo piston stem 14 and the other end 16 contacting an anchor stop 18 fixed in position against displacement on the wall of a transmission casing 20. The casing contains the components of a gearset, hydraulically actuated clutches and brakes, which control the gearset components to produce the various speed ratios of the transmission. The clutch drum is locked against rotation when the servo piston 22 is forced by hydraulic fluid upward to apply the brake band.

The casing defines a cylinder 24, within which cylinder piston 22 moves in response to the presence of hydraulic pressure below the piston and the effect of the force of a compression spring 26 located between piston 22 and a stop surface 28 formed in the transmission case 20. A spring retainer 30 includes a flange 32 that seats against stop surface 28.

Figure 4:
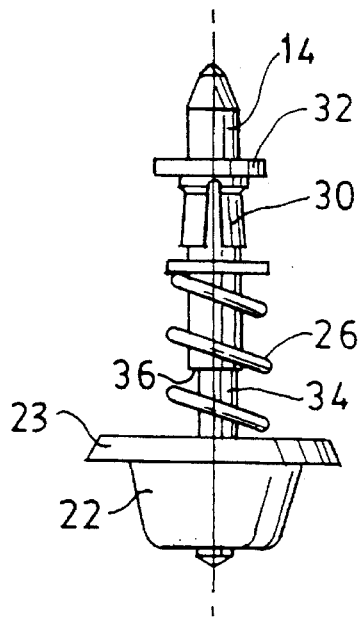

Referring next to FIG. 4, the servo piston 22 carries an elastomeric hydraulic seal 23, which is sized to fit closely against the walls of cylinder 24. Servo piston stem 14, fixed to piston 22 so that the stem and piston move as a unit, includes a larger diameter cylindrical portion located at its upper end and a smaller diameter cylindrical portion 34 located at its lower end, these portions forming an annular shoulder 36 disposed in a substantially diametrical plane across the longitudinal axis of the stem 14 where the cylindrical portions meet.

An assembly comprising the servo piston 22 and piston stem 14 is arranged with compression spring 26 loosely fitting over the servo stem and spring retainer 30 located above the spring and arranged such that its flange 32 is located at the uppermost end of the retainer.

Figure 2:
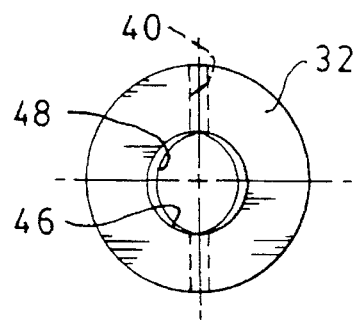
FIG. 2 is a top view of a spring retainer for use in the servo of FIG. 1.
Figure 3:
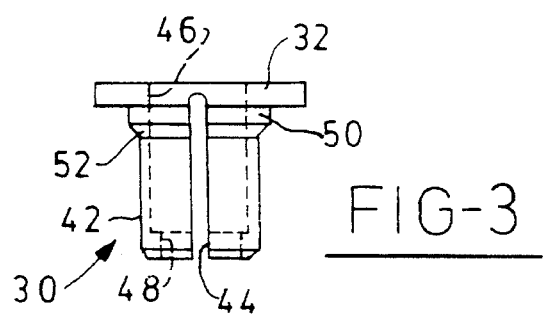
FIG. 3 is a side view of the spring retainer of FIG. 2.

Referring now to FIGS. 2 and 3, the lower surface of flange 32 is formed with a diametrically directed slot 40 that passes partially through the thickness of flange 32. The cylindrical portion 42 includes axially directed slots 44 extending along the length of the cylindrical portion 42, located at diametrically opposite sides of the cylindrical portion and aligned with slots 40. Retainer 30 has a central opening 46 extending along its length and sized laterally in relation to the diameter of piston stem 14 so that it fits loosely over the surface of the stem. The inner surface of the retainer is formed with a shoulder 48 having a smaller lateral dimension than that of the central opening 46 and the diameter of the piston stem so that the stem produces a slight interference fit causing cylindrical portion 48 to flare slightly outward, which flaring is facilitated by the two axially extending slots 44. Retainer 30 is preferably formed of molded plastic so that as the retainer moves along the surface of piston stem 14 it resiliently grasps that surface and is urged radially inward toward the surface of the stem. When shoulder 48 on the retainer reaches shoulder 36 on the stem, the interference fit between retainer 30 and stem 14 allows shoulder 48 to become engaged on shoulder 36, thereby preventing movement of the retainer upward on stem 14 but permitting upward movement of the stem relative to the retainer.

Located immediately below flange 32 is a circular shoulder 50 whose diameter is sized to fit within compression spring 26 so that the upper surface of the spring becomes seated on the lower surface of the flange 32. An annular chamfer 52 located at the lower side of shoulder 50 facilitates movement of the compression spring onto the surface of shoulder 50.

Figure 5:
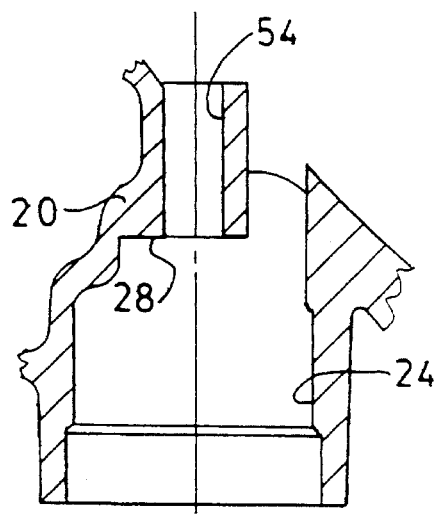
FIGS. 4, 5, and 6 show a cross section through the longitudinal plane of the servo according to this invention shown in various stages of assembly.
Figure 5:
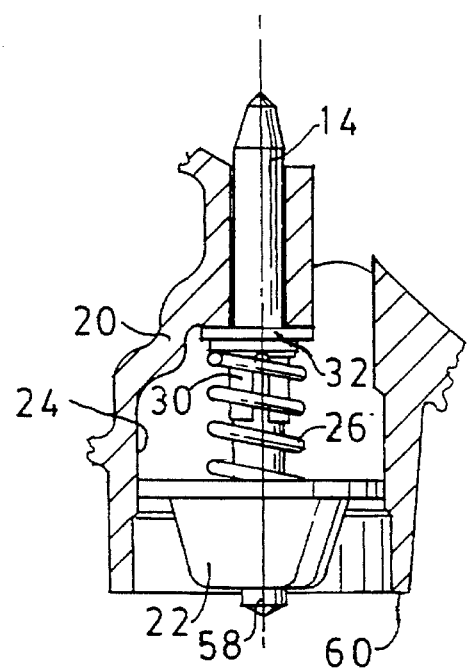
Figure 6:
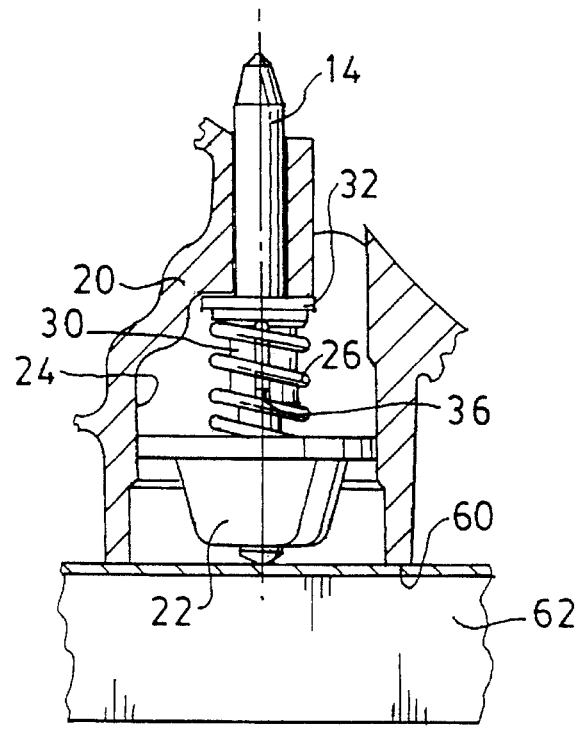

Installation of a brake servo in the transmission casing is described next with reference to FIGS. 4–6. The installation begins, as shown in FIG. 4, by placing the servo spring over the piston stem, and then placing retainer 30 on the stem above the spring. These parts are then inserted preferably by hand, into the transmission case so that the stem fits within the pilot bore 54.

Piston 22 is then forced upward against spring 26 compressing the spring force being reacted on the stop surface 28 formed in the transmission case. As FIG. 5 shows, stem 14 moves upward into the pilot bore of the transmission casing sufficiently so that shoulder 48, on the inner surface of retainer 30, seats and locks on shoulder 36 at the lower end of the piston stem 14, thereby holding the retainer on the piston stem shoulder against upward displacement relative to the stems and storing the potential energy present in the spring. The lower end 58 of the piston stem protrudes slightly below the lower surface 60 of the transmission casing 20.

Thereafter, control gaskets, a plate, and valve bodies 62 are attached by bolting them to the lower surface of casing 20. This attachment is effected by pushing piston 22 and the piston stem assembly further into cylinder 24 to the installed position shown in FIG. 6, where the control gaskets, plate, and valve body 62 are in contact with the lower surface 60 of the transmission casing. In the installed position, the spring retainer is unloaded because shoulder 36 moves further up the axis of piston stem 14. Shoulder 48 remains in place due to contact of flange 32 on stop surface 28. Retainer 30 is thereafter no longer locked on the piston stem because its shoulder 36 is moved upward out of contact with shoulder 36.

Although the form of the invention shown and described here constitutes the preferred embodiment of the invention. It is not intended to illustrate all possible forms of the invention. Words used here are words of description rather of limitation; various changes in the form of the invention may be made without departing from the spirit and scope of the invention as disclosed.

I claim;

1. A servo for actuating a device, comprising:

a casing defining a cylinder and a cavity;

a brake band located in the casing cavity, having first and second ends, the first end fixed to the casing against displacement relative to the second end, the second end displaceable with respect to the first end;

a piston located in the cylinder, having a stem adapted to move the second end of the brake band with respect to the first end of the brake band in response to piston movement within the cylinder;

a retainer having a opening through which the piston extends;

a spring carried on the piston, having a first end contacting the retainer and a second end contacting the piston, biasing the retainer into contact with the casing;

means for holding the piston against movement relative to the retainer in one axial direction and permitting movement of the piston relative to the retainer in a direction opposite the first direction comprising a first locking surface formed on the stem, a second locking surface formed on the retainer, and means for resiliently urging the first and second locking surfaces into mutual engagement.

2. The servo of claim 1 wherein:

the casing further defines a pilot bore aligned with the cylinder;

the piston supports the stem fixed thereto and extending along the cylinder, the stem extending into the pilot bore; and the retainer surrounds the stem.

3. The servo of claim 1 wherein the holding means comprises:

a first shoulder formed at a predetermined axial position on the piston, defining a first surface directed transverse to the direction of piston movement;

a second shoulder formed on the retainer, defining a surface adapted to engage the first surface, said engagement preventing movement of the piston relative to the retainer in one axial direction and permitting movement of the piston relative to the retainer in a direction opposite the first direction; and means for resiliently urging the first and second shoulders into mutual engagement.

4. The servo of claim 3 wherein the urging means comprises:

an interference fit of the retainer on the stem, the retainer elastically deforming radially outward due to the interference fit, the retainer urged radially inward due to said elastic deformation.

5. A servo for actuating a device, comprising:

a casing defining a cylinder;

a piston located for sliding movement in the cylinder and having a stem;

a retainer having a opening through which the piston extends;

a spring carried on the piston, having a first end contacting the retainer and a second end contacting the piston;

means for holding the piston against movement relative to the retainer in one axial direction and permitting movement of the piston relative to the retainer in a direction opposite the first direction comprising a first locking surface formed on the stem, a second locking surface formed on the retainer, and means for resiliently urging the first and second locking surfaces into mutual engagement.

6. The servo of claim 5 wherein:

the casing further defines a pilot bore aligned with the cylinder;

the piston supports the stem fixed thereto and extending along the cylinder, the stem extending into the pilot bore; and the retainer surrounds the stem.

7. The servo of claim 5 wherein the holding means comprises:

a first shoulder formed at a predetermined axial position on the piston, defining a first surface directed transverse to the direction of piston movement;

a second shoulder formed on the retainer, defining a surface adapted to engage the first surface, said engagement preventing movement of the piston relative to the retainer in one axial direction and permitting movement of the piston relative to the retainer in a direction opposite the first direction; and means for resiliently urging the first and second shoulders into mutual engagement.

8. The servo of claim 7 wherein the urging means comprises:

an interference fit of the retainer on the stem, the retainer elastically deforming radially outward due to the interference fit, the retainer urged radially inward due to said elastic deformation.

9. A servo for actuating a device, comprising:

a piston sealed for movement along a cylinder, supporting a stem fixed to the piston and directed axially from the piston, the stem having a first cylindrical surface, a second cylindrical surface adjacent and slightly smaller than the first cylindrical surface, said first and second surfaces defining a first shoulder;

a retainer having a opening through which the piston stem extends, a second shoulder extending into the opening and sized smaller than the stem to produce an interference fit therebetween;

a spring carried on the stem, having a first end adjacent the retainer and a second end adjacent the piston;

the second shoulder urged into engagement with the first shoulder of the stem due to said interference fit, said engagement holding the piston against movement relative to the retainer in one axial direction and permitting movement of the piston relative to the retainer in a direction opposite the first direction.

10. The servo of claim 9 wherein the retainer includes an axially directed slot located to facilitate deformation of the retainer due to the interference fit, said interference fit of the retainer on the stem elastically deforming the retainer radially outward from the stem and urging the retainer shoulder radially inward toward the stem.

* * * * *